US012600872B2

(12) United States Patent
Li et al.

(10) Patent No.: US 12,600,872 B2
(45) Date of Patent: Apr. 14, 2026

(54) COATING COMPOSITION, PREPARATION METHOD THEREFOR AND USE THEREOF

(71) Applicants: YANTAI ZHENGHAI MAGNETIC MATERIAL CO., LTD., Shandong (CN); YANTAI GAOSHI NEW MATERIAL TECHNOLOGY CO., LTD., Shandong (CN)

(72) Inventors: Zhiqiang Li, Shandong (CN); Mingliang Gao, Shandong (CN); Yongjiang Yu, Shandong (CN); Hongyu Zhou, Shandong (CN); Bin Zhou, Shandong (CN); Pengfei Wang, Shandong (CN); Yunting Su, Shandong (CN)

(73) Assignees: YANTAI ZHENGHAI MAGNETIC MATERIAL CO., LTD., Yantai (CN); YANTAI GAOSHI NEW MATERIAL TECHNOLOGY CO., LTD., Yantai (CN)

( * ) Notice: Subject to any disclaimer, the term of this patent is extended or adjusted under 35 U.S.C. 154(b) by 134 days.

(21) Appl. No.: 18/553,611

(22) PCT Filed: Mar. 31, 2022

(86) PCT No.: PCT/CN2022/084263
§ 371 (c)(1),
(2) Date: Oct. 13, 2023

(87) PCT Pub. No.: WO2022/206875
PCT Pub. Date: Oct. 6, 2022

(65) Prior Publication Data
US 2024/0034892 A1    Feb. 1, 2024

(30) Foreign Application Priority Data
Apr. 2, 2021    (CN) .......................... 202110362416.8

(51) Int. Cl.
*C09D 7/65* (2018.01)
*C09D 7/40* (2018.01)
(Continued)

(52) U.S. Cl.
CPC ................. *C09D 7/65* (2018.01); *C09D 7/61* (2018.01); *C09D 7/63* (2018.01); *C09D 7/69* (2018.01);
(Continued)

(58) Field of Classification Search
CPC ........ C08J 9/32; C09D 163/00; C09D 167/00; C09D 2203/22
See application file for complete search history.

(56) References Cited

U.S. PATENT DOCUMENTS 5,520,961 A    5/1996    Lysell et al.
5,786,095 A    7/1998    Batdorf
(Continued)

FOREIGN PATENT DOCUMENTS

CN    108977111 A    * 12/2018    ............ C09J 163/00
CN    112424309 A    2/2021
(Continued)

OTHER PUBLICATIONS

Machine translation CN 108977111A (Year: 2025).*
(Continued)

*Primary Examiner* — Alexandre F Ferre
(74) *Attorney, Agent, or Firm* — NKL Law; Allen Xue

(57) ABSTRACT
A coating composition, a preparation method therefor and use thereof are provided. The coating composition includes at least 60% heat-expandable microspheres having a wall thickness of less than or equal to 5 μm, a water-based thermoplastic resin, a water-based thermosetting resin, and a hot-melt filling resin. Thin-shell spheres can be quickly softened and ruptured within a short time in the heat-
(Continued)

expansion process, and with the volatilization of an organic solvent, the coating composition cross-links with a resin matrix in the coating to form a cross-linked network structure, thus strengthening the gap support of the coating, and enabling the coating to achieve stepped expansion. After expansion, some polymer materials wrap an airbag and harden to form a stable hollow structure. Therefore, the expanded coating can be used for the fixation of high temperature-resistant parts, and can maintain adhesive stability when placed in a high-temperature environment (140-180° C.) for a long time.

17 Claims, 3 Drawing Sheets

(51) Int. Cl.

| | | |
|---|---|---|
| *C09D 7/61* | (2018.01) | |
| *C09D 7/63* | (2018.01) | |
| *C09D 133/04* | (2006.01) | |
| *C09D 163/00* | (2006.01) | |
| *C09D 167/00* | (2006.01) | |

(52) U.S. Cl.
  CPC ............. *C09D 7/70* (2018.01); *C09D 133/04* (2013.01); *C09D 163/00* (2013.01); *C09D 167/00* (2013.01)

(56) References Cited

U.S. PATENT DOCUMENTS

| 5,834,526 A | * | 11/1998 | Wu ............................ C08J 9/32 |
|---|---|---|---|
| | | | 521/56 |
| 2006/0177966 A1 | | 8/2006 | Shah |
| 2009/0270533 A1 | | 10/2009 | Umehara et al. |
| 2010/0113627 A1 | | 5/2010 | Matsumoto et al. |
| 2012/0064347 A1 | | 3/2012 | Kita et al. |
| 2014/0364520 A1 | | 12/2014 | Oh et al. |

FOREIGN PATENT DOCUMENTS

| CN | 113388306 A | 9/2021 |
|---|---|---|
| DE | 102014214381 A1 | 1/2016 |
| JP | H05148429 A | 6/1993 |
| JP | 2000017234 A | 1/2000 |
| JP | 2016155919 A | 9/2016 |
| WO | 2007143646 A2 | 12/2007 |
| WO | 2018074316 A1 | 4/2018 |
| WO | 2020017361 A1 | 1/2020 |

OTHER PUBLICATIONS

Geng, Yaozong; "Modern Waterborne Coating Process Formulation Application"; China Petrochemical Press; vol. 5, Mar. 2003; pp. 420-425.

"Encyclopedia of Chemical Industry Index", Chemical Industry Press; vol. 16; Dec. 1998; pp. 528.

* cited by examiner

COATING COMPOSITION, PREPARATION METHOD THEREFOR AND USE THEREOF

CROSS-REFERENCE TO RELATED APPLICATIONS

The present application is a U.S. national stage entry of PCT international application no. PCT/CN2022/084263, filed on Mar. 31, 2022, which claims priority to the prior application with the Chinese patent application No. 202110362416.8 and entitled "COATING COMPOSITION, PREPARATION METHOD THEREFOR AND USE THEREOF" filed to the China National Intellectual Property Administration on Apr. 2, 2021, the content of each is incorporated herein by reference in its entirety.

TECHNICAL FIELD

The present disclosure relates to the technical field of coating compositions, and particularly relates to a coating composition, a preparation method therefor and use thereof.

BACKGROUND

With the development of the automobile industry, high temperature-resistant adhesives are widely used in engine manufacturing, but most of them are special solvent adhesives and are applied by the methods such as adhesive injection and adhesive dispensing to adhere with and fix engine parts. However, the methods described above have the defects of high material cost, high requirements on equipment and process, low processing accuracy, easy occurrence of adhesive overflow, workpiece pollution, uneven adhesive application, and the like.

In recent years, with the rapid development of the new energy automobile industry, the assembly of a motor magnetic sheet has become one of the main processes of engine production. In addition to continuing to adopt traditional adhesive injection methods, various automobile manufacturers are looking for an efficient solution for fixing magnetic materials in the assembly of new energy automobile engines.

To date, epoxy powder resin coatings have been widely used in automobile parts. For example, in the patent document with the publication No. JP1993148429A, in order to improve the impact resistance of a film, a powder composition of organic foaming agents is added to the epoxy resin to obtain a curing material containing bubbles in the interior thereof, so as to provide a coating with better mechanical impact resistance and thermal impact resistance.

For another example, in the patent document with the publication No. US20090270533A1, disclosed is a heat-curable powder coating composition, in which a resin having a cross-linkable functional group, heat-expandable resin particles, a curing agent, and a fibrous filler are used to obtain a coating film excellent in long-term corrosion resistance as well as excellent in chipping resistance, flexibility, and adhesion, so as to solve the problem of poor chipping resistance and corrosion resistance of the coating due to the formation of a large number of air bubbles on the contact surface of a curing material and a matrix in the film-forming process.

The heat-expandable resin particle, i.e., the expandable microsphere, is a thermoplastic hollow polymer microsphere, which consists of a thermoplastic shell and liquid alkane gas enclosed within the shell. In a heating process, the gas pressure inside the microsphere shell increases, the thermoplastic shell softens, and the expanding volume of the microsphere increases significantly. The expandable microsphere coating prepared by the principle described above is widely applied to the fields of plastics, wallpapers, adhesives, printing ink, printings, and the like. Heat-curable powder coatings containing expandable microspheres are generally applied to the underside of an automobile to mitigate the effect of rocks that pop up during driving on the underside of the automobile.

For example, in the patent document with the publication No. DE102014214381A1, a heat-curable powder coating is applied to the assembly process of a motor magnetic sheet for an automobile to provide the magnetic sheet with a coating, the coating consisting of a heat-curable resin matrix in which heat-expandable microspheres are embedded, the softening temperature of the matrix being lower than the reaction temperature of the heat-expandable microspheres, and under the influence of a temperature higher than the reaction temperature of the microspheres, the volume of the microspheres increasing irreversibly. When the magnetic sheet coated with the coating is heated to a temperature higher than the reaction temperature of the expandable microspheres, the resin matrix softens and then the microspheres expand. The softened matrix has no resistance to expansion, the total coating thickness of the magnetic sheet increases, and the gap between the magnetic sheet and the rotor slot is filled, so that the magnetic sheet is fixed in the rotor slot. By using the heat-curable powder as a coating to fix the rotor in the motor assembly process, the assembly efficiency and the processing accuracy are improved. However, the powder spraying process of the powder coating has the problems of safe operation and environmental pollution in actual operation, and the working environment of the motor is severe, which requires that in the environment of high temperature, high humidity, and high-speed rotation, the stability and the adhesiveness of the magnetic sheet are maintained, and the magnetic sheet has high corrosion resistance.

SUMMARY

In order to improve the technical problems described above, the present disclosure provides a coating composition, which comprises a composition of at least 60%, e.g., 60%, 70%, 75%, or 80%, of heat-expandable microspheres having a wall thickness$\leq 5$ $\mu m$; wherein, for example, the microspheres have a wall thickness$\leq 5$ $\mu m$, e.g., 5 $\mu m$, 4.5 $\mu m$, 3 $\mu m$, 2 $\mu m$, 1 $\mu m$, or 0.5 $\mu m$.

According to embodiments of the present disclosure, in the composition, the composition of the heat-expandable microspheres has a weight percentage of no more than 20%, such as 15%, 10%, 8%, or 6%.

According to embodiments of the present disclosure, the heat-expandable microspheres have an initial thermal expansion temperature $T_1$, wherein $100° C. \leq T_1 \leq 200° C.$ For example, $125° C. \leq T_1 \leq 180° C.$, such as $T_1$ is 120° C., 130° C., 150° C., 160° C., 170° C., 190° C., or any value between the enumerated temperature points.

According to embodiments of the present disclosure, the heat-expandable microspheres have a maximum heat-resistant temperature $T_2$, wherein $145° C. \leq T_2 \leq 215° C.$ For example, $150° C. \leq T_2 \leq 205° C.$, such as $T_2$ is 155° C., 160° C., 165° C., 175° C., 185° C., 195° C., 200° C., or any value between the enumerated temperature points.

As can be understood by those skilled in the art, the initial thermal expansion temperature $T_1$ is $\leq$ the maximum heat-resistant temperature $T_2$.

According to embodiments of the present disclosure, the heat-expandable microspheres having a particle size of 8 $\mu m \leq D \leq 20$ $\mu m$ have a weight percentage of no less than 60%, e.g., 60%, 65%, 70%, 80%, 90%, or 100%, of the total weight of the heat-expandable microspheres;

preferably, the heat-expandable microspheres having a particle size of 10 $\mu m \leq D \leq 15$ $\mu m$ have a weight percentage of no less than 50%, e.g., 55%, 60%, or 70%, of the total weight of the heat-expandable microspheres.

According to embodiments of the present disclosure, the heat-expandable microspheres include a thermoplastic polymer shell and a liquid alkane enclosed within the thermoplastic polymer shell.

For example, the thermoplastic polymer shell may be made from a material that is heat-fusible or that cracks after the heat-expansion. For example, the thermoplastic polymer shell is made from a material selected from a copolymer of vinylidene chloride and acrylonitrile, polyvinyl alcohol, polyvinyl butyral, polymethylmethacrylate, polyacrylonitrile, polyvinylidene chloride, polysulfone, a vinylidene chloride homopolymer, a random terpolymer of vinylidene chloride, acrylonitrile, and divinylbenzene, polystyrene, and polyvinyl chloride.

According to embodiments of the present disclosure, the liquid alkane may be one, two, or more selected from ethane, propane, isobutane, n-pentane, and isopentane.

According to embodiments of the present disclosure, the composition of the heat-expandable microspheres may further optionally contain a solvent, wherein the solvent includes at least one organic solvent having a boiling point above 220° C., for example, the organic solvent having a boiling point above 220° C. may be selected from a dodecanol ester.

According to embodiments of the present disclosure, in addition to at least one organic solvent having a boiling point above 220° C., the solvent may include one or two of ethylene glycol monobutyl ether and dipropylene glycol monobutyl ether.

In the present disclosure, the "initial particle size" refers to the median particle size $D_{50}$ of the heat-expandable microspheres before the heat-expansion, and the "thickness" refers to the thickness of the shell wall of the heat-expandable microspheres before the heat-expansion.

The particle size described above is a volume mean diameter, and the diameter of the unexpanded heat-expandable microspheres and the thickness of the shell wall of the unexpanded heat-expandable microspheres can be determined by any method known in the art.

According to embodiments of the present disclosure, the heat-expandable microspheres and the solvent are in a weight ratio of (4-40):1, preferably (5-20):1, such as 4:1, 5:1, 6:1, 8:1.2, 7:1, 8:1, 9:1, 10:1, 15:1, or 18:1.

According to embodiments of the present disclosure, the composition of the heat-expandable microspheres may further optionally contain an inorganic fiber. For example, the inorganic fiber is in the form of a filament or sheet (e.g., flakes). For example, the inorganic fiber may be one, two or more selected from a nano-aluminosilicate fiber, a carbon fiber, a boron fiber, and the like. After the expansion of the composition of the heat-expandable microspheres, the inorganic fiber may be mutually infiltrated with a resin in the coating described below, and plays a role in skeleton support and strength increase in the coating described below, so as to improve the strength and shrinkage resistance of the expandable coating.

According to embodiments of the present disclosure, the inorganic fiber and the solvent are in a weight ratio of (0-2):1, e.g., (0.5-1.5):1, such as 0.5:1, 3:5, 0.7:1, 0.85:1, 0.9:1, 1:1, or 1.2:1.

According to embodiments of the present disclosure, the composition of the heat-expandable microspheres has an expansion rate of 150%-300%, e.g., 180%-250%.

According to an exemplary embodiment of the present disclosure, the composition of the heat-expandable microspheres comprises heat-expandable microspheres, a solvent, and an inorganic fiber, wherein:

(1) the heat-expandable microspheres having a particle size of 8 $\mu m \leq D \leq 20$ $\mu m$ have a weight percentage of no less than 60%, e.g., 60%, 65%, 70%, 80%, 90%, or 100%, of the total weight of the heat-expandable microspheres;

the heat-expandable microspheres having a particle size of 10 $\mu m \leq D \leq 15$ $\mu m$ have a weight percentage of no less than 50%, e.g., 55%, 60%, or 70%, of the total weight of the heat-expandable microspheres;

(2) at least 60% of the heat-expandable microspheres have a wall thickness $\leq 3$ $\mu m$;

(3) the solvent includes at least a dodecanol ester;

the heat-expandable microspheres and the solvent are in a weight ratio of (5-20):1;

(4) the inorganic fiber is a nano-aluminosilicate fiber, and the inorganic fiber and the solvent are in a weight ratio of (0.5-1.5):1.

According to embodiments of the present disclosure, the composition of the heat-expandable microspheres is prepared by mixing starting materials including heat-expandable microspheres, a solvent, and optionally an inorganic fiber.

According to embodiments of the present disclosure, the coating composition further comprises a water-based thermoplastic resin. The water-based thermoplastic resin has a glass transition temperature of −20° C. to 60° C. For example, in the composition, the water-based thermoplastic resin may have a weight percentage of 10%-30%, such as 15%, 20%, 25%, or 30%.

Preferably, the water-based thermoplastic resin is at least one selected from water-based acrylic resin and polyurethane resin.

According to embodiments of the present disclosure, the coating composition further comprises a water-based thermosetting resin. For example, in the composition, the water-based thermosetting resin may have a weight percentage of 10%-40%, such as 15%, 20%, 25%, or 30%.

Preferably, the water-based thermosetting resin is at least one selected from water-based epoxy resin and hydroxyl acrylic acid.

According to embodiments of the present disclosure, the coating composition further comprises a hot-melt filling resin. For example, in the composition, the hot-melt filling resin may have a weight percentage of 10%-35%, such as 10%, 15%, 20%, 25%, or 30%.

Preferably, the hot-melt filling resin is at least one selected from modified chlorinated polyvinyl chloride, polyester resin, polyurethane, polyamide, polyether sulfone, epoxy, and polymethylmethacrylate.

In the coating composition of the present disclosure, the water-based thermoplastic resin has a content lower than that of the water-based thermosetting resin, and preferably, the water-based thermoplastic resin and the water-based thermosetting resin are in an amount ratio of 1:1-1:2, such as 1:1, 1.5:1, or 1:2.

In the present disclosure, too low amount of the thermoplastic resin will result in an insufficient expansion rate of the coating composition to achieve an expansion effect; however, too high amount of the thermoplastic resin will result in severe shrinkage of the expandable coating after being cured, so that the application requirement in motor assembly cannot be met. The hot-melt filling resin has a glass transition temperature of 60° C. or higher, preferably 130° C. or higher, and a resin in a translucent or transparent molten state when being heated at a high temperature is preferred. Therefore, when the coating composition is applied as an expandable adhesive, the coating can be adhered with the contact surface to provide supporting force.

Preferably, the sum of the mass of the thermoplastic resin and the thermosetting resin and the mass of the hot-melt filling resin are in a ratio of 1.5:1-2.5:1, such as 1.5:1, 2:1, or 2.5:1.

According to embodiments of the present disclosure, the coating composition may further optionally contain other conventional coating additives. Preferably, the other conventional coating additives account for 0-15% of the total weight of the coating composition, more preferably 1%-10% of the total weight of the coating composition, such as 1%, 2%, 2.5%, 3%, 4%, or 5% of the total weight of the coating composition.

According to one embodiment of the present disclosure, the other conventional coating additives may be selected, for example, from a curing agent, a dispersant, a defoamer, a filler, a cross-linking agent, a thickener, a colorant, and the like.

For example, the coating composition may optionally contain 0.2%-1.5% dispersant. For example, the dispersant may be one selected from nonionic dispersant, anionic dispersant, cationic dispersant, and the like, to allow the coating composition to form a stable emulsion. Preferably, the dispersant may be one, two, or more selected from amine salts, quaternary ammonium salts, pyridinium salts, ethylene glycol, and acrylate polymer dispersants.

For example, the coating composition may optionally contain 1%-3% filler to improve the crystallization tendency and solubility of the coating composition, increase the glass transition temperature and hardness of the expandable coating, and reduce a shrinking percentage of the coating after the expansion. Preferably, the filler may be one, two, or more selected from insulating carbon black, calcium carbonate, and talc.

According to embodiments of the present disclosure, the coating composition further comprises water.

According to embodiments of the present disclosure, the sum of the weight percentages of the components in the coating composition is 100%.

The present disclosure further provides a preparation method for the coating composition described above, which comprises mixing a composition of heat-expandable microspheres, a water-based thermoplastic resin, a water-based thermosetting resin, a hot-melt filling resin, and optionally other conventional coating additives according to the ratio described above.

The present disclosure further provides a method for improving the stability of a heat-expandable coating, which comprises applying the coating composition described above to a matrix body, and heating the matrix body to obtain the heat-expandable coating.

According to embodiments of the present disclosure, the matrix body is a magnetic material, e.g., a motor magnetic sheet used in the engine manufacturing and production, preferably a neodymium-iron-boron magnet.

According to embodiments of the present disclosure, the application may be selected from methods known in the art, e.g., spray coating, roller coating, brush coating, coating, electroplating, dipping, roll coating, and the like, of applying the coating composition to the surface of the matrix body.

According to embodiments of the present disclosure, the method further comprises the step of performing drying on or drying the matrix body to which the coating composition is applied.

According to embodiments of the present disclosure, the heat-expandable coating has a dry film thickness of 100-300 μm, such as 100 μm, 150 μm, 200 μm, or 300 μm.

The present disclosure further provides a matrix comprising a coating and a matrix body, wherein the coating is prepared from the coating composition described above.

According to embodiments of the present disclosure, the coating has a thickness of 100-300 μm, such as 100 μm, 150 μm, 200 μm, or 300 μm.

According to embodiments of the present disclosure, the coating is located on the surface of the matrix body.

Preferably, the matrix body has the meaning as described above.

Preferably, the coating composition has the meaning as described above.

Advantageous Effects (1) In a heat-expansion process of the coating composition of the present disclosure, thin-shell spheres can be quickly softened and destroyed within a short time, and with the volatilization of an organic solvent, the thin-shell spheres are cross-linked, on the surface and inside of the coating, with a resin matrix in the coating to form a cross-linked network structure, thus strengthening the gap support of the coating, and enabling the coating to achieve stepped expansion, and after expansion, some polymer materials wrap an airbag and harden to form a stable hollow structure. Therefore, the expanded coating has a stable structure, high heat shrinkage resistance, high mechanical strength, and adhesive force, can be applied to the fixation of high-temperature-resistant parts, and can maintain adhesive stability when being stored in a high-temperature environment (140-180° C.) for a long time.

(2) The high-boiling-point solvent in the coating composition of the present disclosure can also lower the softening film-forming temperature of the resin in the coating composition to improve the compatibility of the resin. Therefore, the prepared heat-expandable coating has high thermal shrinkage resistance, high mechanical strength, and adhesive force after the heat expansion, can be applied to the fixation of high-temperature resistant parts, and can maintain adhesive stability for a long time in a high-temperature environment (140-180° C.).

(3) The water-based high-temperature-resistant heat-expandable adhesive coating can reduce the problems of VOC emission and environmental hazard caused by a solvent adhesive.

(4) In the present disclosure, by adopting an emulsion or dispersion (liquid with flowability) of a water-based thermoplastic resin having a glass transition temperature of −20° C. to 60° C., it is beneficial to improving the low-to-medium-temperature film-forming property of the coating, so that the coating can be self-drying at room temperature (15-35° C.) or a complete coating can be formed under the baking conditions at a lowto-medium temperature (35-90° C.). Moreover, the coating can be baked at 150° C. for 96 h without yellowing or slightly yellowing, is resistant to artificial aging for more than 360 h, and has a pulverization level of more than 1.

(5) In the present disclosure, by adding a small amount of hot-melt filling resin, which has a particle size above 800 meshes and a glass transition temperature above 60° C., is in a translucent or transparent molten state when being heated at a high temperature above 130° C., has certain flowability and adhesive force, and can improve the compatibility among the components at a high temperature, the prepared coating has enough fineness, uniformity, and compactness after being dried at a low-to-medium temperature. Moreover, the coating is baked at a high temperature above 150° C. for more than 96 h without yellowing substantially, so that the high-temperature resistance and the service life of the coating can be improved.

(6) In the present disclosure, by adopting an inorganic substance (nano-aluminum silicate fiber or superfine calcined mica powder) with a fibrous or flaky structure or a high-temperature-resistant organic silicon resin reinforcing agent with high hardness, a coating film can be mutually infiltrated with a resin after being expanded, and plays a role in skeleton support and strength increase in the coating, so as to improve the strength and shrinkage resistance of the expandable coating.

in the figure: 1 indicates an expandable coating; 2 indicates a sintered magnet; 3 indicates a reserved gap; 4 indicates a motor tooling.

Figure 4:

FIG. 4 shows a comparison of IR spectra of the coating of Example 7 before and after expansion and foaming.

DETAILED DESCRIPTION

The technical solutions of the present disclosure will be further illustrated in detail with reference to the following specific examples. It will be understood that the following examples are merely exemplary illustrations and explanations of the present disclosure, and should not be construed as limiting the protection scope of the present disclosure. All techniques implemented based on the content of the present disclosure described above are included within the protection scope of the present disclosure.

Unless otherwise stated, the starting materials and reagents used in the following examples are all commercially available products or can be prepared using known methods.

The heat-expandable microspheres used in the present disclosure are commercially available, and are, e.g., a composition of two or more selected from 920DU80, 920DU20, 909DU80, 920DU40, and 461DU40 in the Expancel series from AKZO-Nobel.

The following table shows the main parameters of five heat-expandable microspheres in the Expancel series from AKZO-Nobel.

| Model | Diameter (±1)/μm | Initial expansion temperature $T_1/°$ C. | Maximum heat-resistant temperature $T_2/°$ C. |
|---|---|---|---|
| 920DU80 | 18-24 | 123-133 | 185-195 |
| 920DU20 | 5-9 | 120-145 | 155-175 |
| 909DU80 | 18-24 | 120-130 | 175-190 |
| 920DU40 | 10-16 | 123-133 | 185-195 |
| 461DU40 | 9-15 | 100-107 | 145-152 |

Examples 1-5

The expandable microspheres, the dodecanol ester, and the inorganic fiber in the composition of the heat-expandable microspheres are in a weight ratio of 8:1.2:0.8, that is, the weight percentages of the components are as follows: 8 wt % expandable microspheres, 1.2 wt % dodecanol ester, and 0.8 wt % inorganic fiber.

The compositions of heat-expandable microspheres as shown in Table 1 comprise heat-expandable microspheres.

A combination of different heat-expandable microspheres in the Expancel series from AKZO-Nobel was used. The microspheres of model 920DU80 and model 461DU40 were mixed homogeneously in a weight ratio of 1:2 to obtain a composition of heat-expandable microspheres having an initial particle size of 15.50 μm (as determined by BFS-MAGIC from sympatec, Germany) and a mean wall thickness of 2 μm, with 90% of the microspheres having a wall thickness≤5 μm (Examples 1-5).

The preparation method for the coating compositions of Examples 1-5 comprises the following steps:

firstly, mixing expandable microspheres, a dodecanol ester, and a nano-aluminosilicate fiber to prepare a composition of the heat-expandable microspheres, then adding the composition of the heat-expandable microspheres and other coating additives (a filler of insulating carbon black and a dispersant of ethylene glycol) to a water-based coating resin under stirring at a low shear rate.

Coating composition samples 1-5 were prepared according to the proportions in the table below.

TABLE 1

| Components of coatings | | | | | |
|---|---|---|---|---|---|
| Component | Sample 1 | Sample 2 | Sample 3 | Sample 4 | Sample 5 |
| Water-based acrylic resin (wt %) | 20 | 25 | 15 | 35 | 8 |
| Water-based epoxy resin (wt %) | 30 | 25 | 30 | 10 | 26 |
| Polyester resin (wt %) | 25 | 30 | 30 | 30 | 44 |
| Insulating carbon black (wt %) | 2 | 2 | 2 | 2 | 2 |
| Ethylene glycol (wt %) | 0.5 | 0.5 | 0.5 | 0.5 | 0.5 |
| Expandable composition (wt %) | 10 | 10 | 10 | 10 | 10 |
| Water-based organosilicon resin (wt %) | 2 | 1 | 5 | 5 | 4.5 |
| Water (wt %) | 10.5 | 6.5 | 7.5 | 7.5 | 9.5 |

Examples 6-11

The content, the particle size, and the wall thickness of the expandable microspheres and the components and the content of the high-boiling-point solvent in the composition of the heat-expandable microspheres will affect the performance of the expandable coating, and the amount of the expandable microspheres, the solvent, and the inorganic fiber as the composition of the heat-expandable microspheres will affect the performance of the coating compofirstly, mixing expandable microspheres, a dodecanol ester, and a nano-aluminosilicate fiber to prepare a composition of the heat-expandable microspheres, then adding the composition of the heat-expandable microspheres and other coating additives (a filler of insulating carbon black, a thickener of acrylic acid, a defoamer of polydimethylsiloxane, and a dispersant of ethylene glycol) to a water-based coating resin under stirring at a low shear rate.

TABLE 2

| Components of compositions of heat-expandable microspheres | | | | | | |
| --- | --- | --- | --- | --- | --- | --- |
| Component | Sample 6 | Sample 7 | Sample 8 | Sample 9 | Sample 10 | Sample 11 |
| Content of expandable microspheres wt % | 9 | 8 | 6 | 8 | 8 | 9 |
| Initial particle size of expandable microspheres μm | 15.50 | 13.10 | 13.10 | 13.10 | 13.10 | 17.30 |
| Proportion % of expandable microsphere having a particle size of $8\ \mu m \leq D_0 \leq 20\ \mu m$ of the total weight | 82 | 75 | 75 | 75 | 75 | 50 |
| Proportion % of expandable microsphere having a particle size of $10\ \mu m \leq D_0 \leq 15\ \mu m$ of the total weight | 60 | 30 | 30 | 30 | 30 | 30 |
| Mean wall thickness of expandable microspheres [1] μm | 2 | 3.5 | 3.5 | 3.5 | 3.5 | 3 |
| Proportion % of expandable microsphere having a wall thickness ≤5 μm | 90% | 70% | 70% | 70% | 70% | 50% |
| Dodecanol ester wt % | 0.5 | 1 | 2 | 0 | 2 | 0.5 |
| Nano-aluminosilicate fiber wt % | 0.5 | 1 | 2 | 2 | 0 | 0.5 |

Note:
[1] the mean wall thickness of the heat-expandable microspheres was obtained by testing with a scanning electron microscope (SEM) S-4700 from Japan Hitachi, and was the mean value of the wall thicknesses of all the microspheres (≥20) on the visual interface.

sition, which in turn will affect the performance of the expandable coating made from the coating composition.

In Examples 6-11, coating composition samples 6-11 were prepared by adjusting components of the composition of the heat-expandable microspheres.

Combinations of different heat-expandable microspheres in the Expancel series from AKZO-Nobel were used. The microspheres of model 920DU80 and model 461DU40 were mixed in a weight ratio of 1:2 to obtain a combination of heat-expandable microspheres having an initial particle size of 15.50 μm (Example 6);

the microspheres of model 920DU80, model 920DU20, and model 920DU40 were mixed in a weight ratio of 1:1:1 to obtain a combination of heat-expandable microspheres having an initial particle size of 13.10 μm (Examples 7, 8, 9, and 10);

the microspheres of model 920DU80, model 909DU80, and model 920DU40 were mixed in a weight ratio of 1:1:1 to obtain a combination of heat-expandable microspheres having an initial particle size of 17.30 μm (Example 11).

The coating composition samples 6-11 contain 25 wt % water-based urethane resin, 35 wt % water-based epoxy resin, 15 wt % urethane resin, 10 wt % polymethylmethacrylate, 1 wt % water-based organosilicon resin, 1 wt % dispersant of ethylene glycol, 2 wt % filler of insulating carbon black, 0.5 wt % thickener of acrylic acid, and 0.5 wt % defoamer of polydimethylsiloxane, and their difference in the composition of the heat-expandable microspheres is shown in Table 2 below.

The preparation method for the coating compositions comprises the following steps:

The coating composition samples of Examples 1-11 were each applied to the surface of a magnetic sheet by roller brush coating, and the surface coating was dried and hardened at room temperature. The hardened coating has certain corrosion resistance, which is convenient for transportation and protection of the magnetic sheet. After the magnetic sheet was transported to the workplace, for example, after the magnetic sheet was transported to a motor rotor assembly site, the magnetic sheet assembly was inserted into a slot of the motor rotor, and the motor rotor assembled with the expandable coating was placed in a high-temperature oven and heated for 10 min when the temperature in the high-temperature oven reached 180° C. The surface of the magnet was coated with a heat-expandable coating, which was softened and expanded after being heated. The expandable microspheres were expanded first after being heated, and then the shell of the expandable microspheres was softened and broken up under the action of a high-boiling-point solvent, and was cross-linked with a resin matrix in the coating to form a coating structure with stable support.

Figure 1:
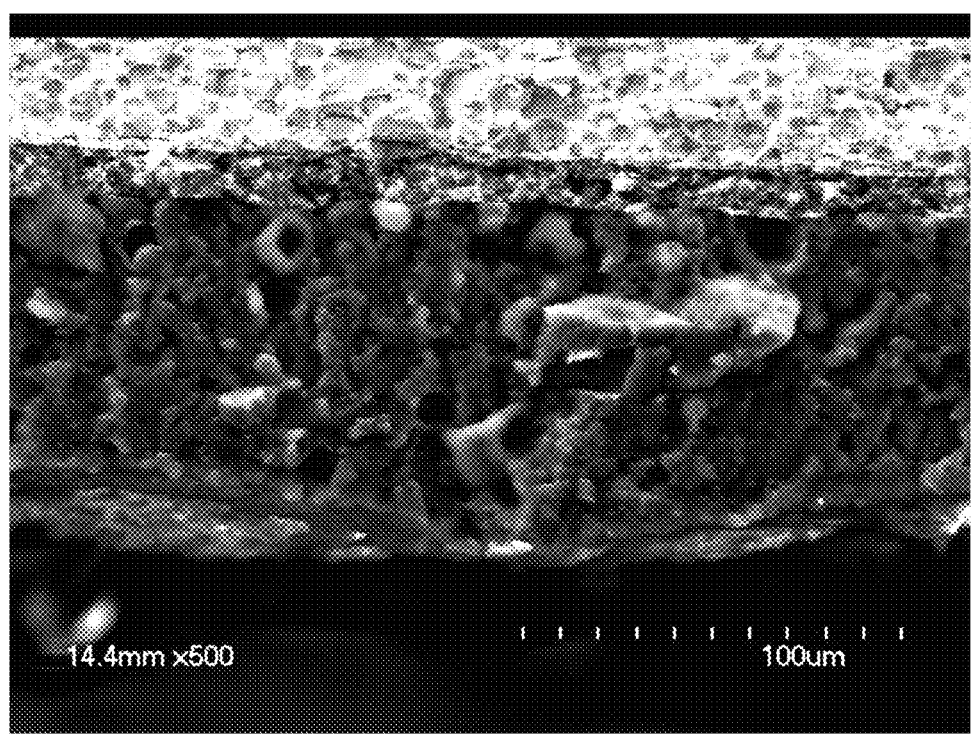
FIG. 1 shows a photograph of the coating of Example 7 in an unexpanded state (scale: 100 μm, 500× magnification).
Figure 2:
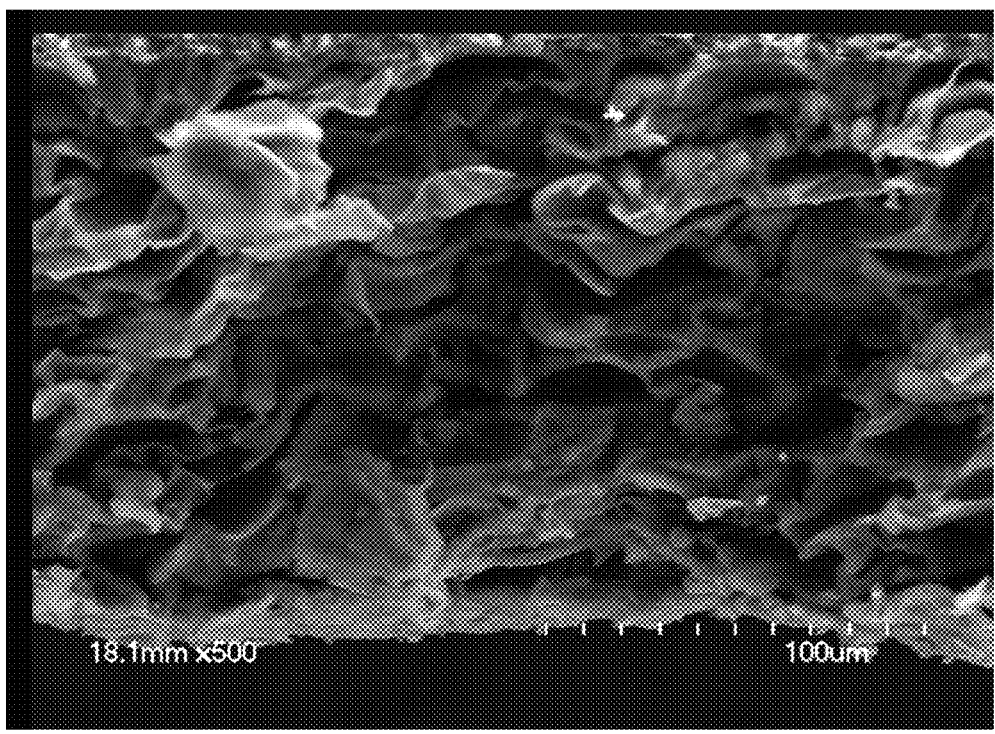
FIG. 2 shows a photograph of the coating of Example 7 in an expanded state (scale: 100 μm, 500× magnification).

As can be seen from FIGS. 1 and 2, the surface of a sintered neodymium-iron-boron magnet was coated with the coating composition of Example 7, and after curing at room temperature, the magnet coated with an expandable coating was obtained. The results are shown in FIG. 1. The magnet coated with the expandable coating was further heated at 190° C. for 10 min to expand the coating, and a cross-linked coating structure was obtained (see FIG. 2).

Figure 3:
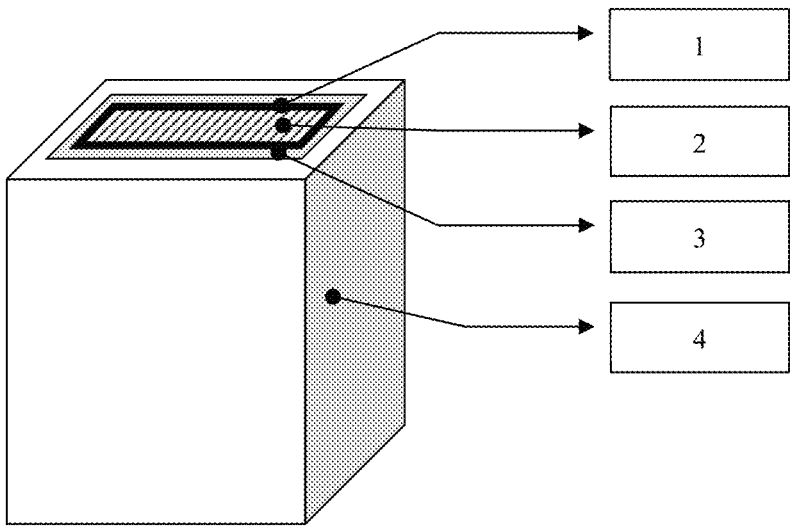
FIG. 3 shows a state where a magnet with an expandable coating is assembled to a motor rotor tooling.

As shown in FIG. 3, 1 indicates an expandable coating; 2 indicates a sintered magnet; 3 indicates a reserved gap for motor assembly; 4 indicates a motor tooling. The sintered magnet 2 with the expandable coating 1 (wherein: the sintered magnet has a specification of 40 mm×15 mm×5 mm) was assembled into the motor tooling 4, the reserved gap for motor assembly was 250 μm, and the thickness of one side of the expandable coating was 110 μm, and the assembly was performed at an expansion temperature. The coating was expanded when being heated to fill the reserved gap of the motor, so that the magnet was tightly fixed in the motor tooling. In this state, the adhesion thrust of the magnet in the motor tooling at room temperature and at a high temperature of 170° C. was detected.

FIG. 4 shows the results for IR spectrum characterization of the coating of Example 7 before and after expansion and foaming. As can be seen from the figure that: after the expansion of the coating, the peak intensity of the characteristic peaks at a wavelength of 1016.36 cm$^{-1}$ and a wavelength of 725.74 cm$^{-1}$ was significantly enhanced, which may be because the resin in the coating reacted again in the high-temperature expansion process of the coating and formed a cross-linked coating structure, so that the coating structure had stable support.

departing from the spirit and principle of the present disclosure shall fall within the protection scope of the present disclosure.

The invention claimed is:

1. A coating composition, comprising: based on a total weight of the coating composition,
   no more than 20% by weight of a composition of heat-expandable microspheres,
   10%-30% by weight of a water-based thermoplastic resin,
   10%-40% by weight of a water-based thermosetting resin, and
   10%-35% by weight of a hot-melt filling resin,
wherein:
   at least 60% of the heat-expandable microspheres have a wall thickness≤5 μm;
   a weight the heat-expandable microspheres having a particle size of 8 μm≤D≤20 μm is no less than 60% of the total weight of the heat-expandable microspheres;
   each of the heat-expandable microspheres comprises a thermoplastic polymer shell and a liquid alkane enclosed within

TABLE 3

| | | | | Expansion conditions and test conditions | | | | | | | |
| --- | --- | --- | --- | --- | --- | --- | --- | --- | --- | --- | --- |
| | Sample 1 | Sample 2 | Sample 3 | Sample 4 | Sample 5 | Sample 6 | Sample 7 | Sample 8 | Sample 9 | Sample 10 | Sample 11 |
| Expansion temperature/° C. | 190 | 190 | 190 | 190 | 190 | 190 | 190 | 190 | 190 | 190 | 190 |
| Expansion time/min | 10 | 10 | 10 | 10 | 10 | 10 | 10 | 10 | 10 | 10 | 10 |
| Thickness of coating film/μm | 110 | 110 | 110 | 110 | 110 | 110 | 110 | 110 | 110 | 110 | 110 |
| Adhesion thrust (room temperature)/Newton | 1305 | 1300 | 1200 | 1088 | 1005 | 1305 | 1288 | 1260 | 1088 | 1080 | 1052 |
| Adhesion thrust (170° C.)/Newton | 300 | 305 | 266 | 215 | 200 | 353 | 335 | 306 | 220 | 230 | 188 |

As can be seen from the results in Table 3 that: changing the amount ratio of the water-based thermoplastic resin to the water-based thermosetting resin and/or the amount ratio of the water-based thermoplastic resin and the water-based thermosetting resin to the hot-melt resin will affect the adhesive thrust of the coating after being cured. By reasonably optimizing the amount ratio of the resins described above, the present disclosure surprisingly found that when the amount ratio of the water-based thermoplastic resin to the water-based thermosetting resin was 1:1-1:2, and the amount ratio of the water-based thermoplastic resin and the water-based thermosetting resin to the hot-melt resin was within the range of 1.5:1-2.5:1, the adhesion thrust of the coating at room temperature could be improved, especially the adhesive thrust of the coating after high-temperature expansion, so that the use requirements of the motor under the high-temperature working conditions could be met.

The performance test results for samples 6-11 showed that: changing the amount ratio of the expandable microspheres, the solvent, and the inorganic fiber in the composition of the heat-expandable microspheres will affect the adhesion thrust of the coating after high-temperature expansion.

The embodiments of the present disclosure have been described above. However, the present disclosure is not limited to the embodiments described above. Any modification, equivalent, improvement, and the like made without the thermoplastic polymer shell, the liquid alkane being selected from ethane, propane, isobutane, n-pentane, isopentane, and mixtures thereof;
the composition of the heat-expandable microspheres comprises dodecanol ester, an inorganic fiber selected from a nano-aluminosilicate fiber, a carbon fiber, a boron fiber, and mixtures thereof;
wherein:
   the water-based thermoplastic resin is at least one selected from water-based acrylic resin and polyurethane resin;
   the water-based thermosetting resin is at least one selected from water-based epoxy resin and hydroxyl acrylic acid resin;
   the hot-melt filling resin is at least one selected from modified chlorinated polyvinyl chloride, polyester resin, polyurethane, polyamide, polyether sulfone, epoxy, and polymethylmethacrylate;
   a weight ratio of the water-based thermoplastic resin to the water-based thermosetting resin is 1:1-1:2; and
   a weight ratio of a sum of the water-based thermoplastic resin and the water-based thermosetting resin to the hot-melt filling resin is 1.5:1-2.5:1.

2. The coating composition according to claim 1, wherein a weight ratio of the heat-expandable microspheres to the dodecanol ester is (4-40):1.

3. The coating composition according to claim 1, wherein the coating composition further comprises one or more coating additives selected from a curing agent, a dispersant, a defoamer, a filler, a cross-linking agent, a thickener, and a colorant.

4. The coating composition according to claim 3, wherein the one or more coating additives account for less than 15% of the total weight of the coating composition.

5. The coating composition according to claim 3, wherein the sum of the weight percentages of the composition of heat-expandable microspheres, the water-based thermoplastic resin, the water-based thermosetting resin, and the hot-melt filling resin in the coating composition is 100%.

6. The coating composition according to claim 1, wherein the heat-expandable microspheres have an initial thermal expansion temperature $T_1$, wherein $100°$ C.$\leq T_1 \leq 200°$ C.

7. The coating composition according to claim 1, wherein the heat-expandable microspheres have a maximum heat-resistant temperature $T_2$, wherein $145°$ C.$\leq T_2 \leq 215°$ C.

8. The coating composition according to claim 1, wherein the inorganic fiber and the dodecanol ester are in a weight ratio of 2:1 or less.

9. The coating composition according to claim 1, wherein the composition of the heat-expandable microspheres has an expansion rate of 150%-300%.

10. The coating composition according to claim 1, wherein the coating composition further comprises water.

11. A matrix comprising a coating and a matrix body, wherein the coating has the coating composition according to claim 1.

12. The matrix comprising the coating and the matrix body according to claim 11, wherein the coating has a thickness of 100-300 μm.

13. The matrix comprising the coating and the matrix body according to claim 11, wherein the coating is disposed on a surface of the matrix body.

14. A method for preparing a heat-expandable coating, comprising applying the coating composition according to claim 1 to a matrix body, and heating the matrix body to obtain the heat-expandable coating.

15. The method for preparing the heat-expandable coating according to claim 14, wherein the matrix body is a magnetic material.

16. The method for preparing the heat-expandable coating according to claim 14, wherein the heat-expandable coating has a dry film thickness of 100-300 μm.

17. A preparation method for the coating composition according to claim 1, comprising mixing a composition of heat-expandable microspheres, a water-based thermoplastic resin, a water-based thermosetting resin, a hot-melt filling resin, and one or more coating additives selected from a curing agent, a dispersant, a defoamer, a filler, a cross-linking agent, a thickener, and a colorant.

* * * * *